US011942709B2

(12) United States Patent
Berg et al.

(10) Patent No.: US 11,942,709 B2
(45) Date of Patent: Mar. 26, 2024

(54) TERMINAL BLADE FOR HEADER ASSEMBLY

(71) Applicant: Steering Solutions IP Holding Corporation, Saginaw, MI (US)

(72) Inventors: David L. Berg, Auburn, MI (US); Trenton R. Townsend, Holly, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 680 days.

(21) Appl. No.: 16/850,765

(22) Filed: Apr. 16, 2020

(65) Prior Publication Data

US 2020/0335892 A1  Oct. 22, 2020

Related U.S. Application Data

(60) Provisional application No. 62/835,313, filed on Apr. 17, 2019.

(51) Int. Cl.
*H01R 12/71* (2011.01)
*B62D 1/16* (2006.01)
*B62D 5/04* (2006.01)

(52) U.S. Cl.
CPC .............. *H01R 12/71* (2013.01); *B62D 1/16* (2013.01); *B62D 5/0403* (2013.01); *H01R 2201/26* (2013.01)

(58) Field of Classification Search
CPC .... H01R 13/405; H01R 13/504; H01R 13/52; H01R 13/5216; H01R 13/03; H01R 13/08; H01R 12/71; H01R 2201/26; H01R 12/58; H01R 43/24; H01R 13/40; H01R 13/025; H01R 13/502; H01R 12/55; H01R 12/57; H01R 12/585; H01R 13/113; B62D 1/16; B62D 5/0403; B62D 5/0406; B62D 3/12; B62D 5/0421; H01H 1/02; H01H 1/58; H01H 2201/022
See application file for complete search history.

(56) References Cited

U.S. PATENT DOCUMENTS 5,243,223 A * 9/1993 Yamada ................. H01L 23/04
257/714
6,152,781 A  11/2000 Huang
(Continued)

FOREIGN PATENT DOCUMENTS

CN  2406360 Y  11/2000
CN  101068896 A  11/2007
(Continued)

OTHER PUBLICATIONS

The First Chinese Office Action and Search Report, with English translation, dated Jul. 2, 2021 for Chinese Application No. 2020103052982, 17 pages.

*Primary Examiner* — Lheiren Mae A Caroc
(74) *Attorney, Agent, or Firm* — Dickinson Wright PLLC

(57) ABSTRACT

A terminal blade for a header assembly includes a first end defining a first axis and being partially coated with an anti-tarnish material and defining an adhesion region spaced from the anti-tarnish material coating. The terminal blade also includes a second end defining a second axis. The terminal blade further includes a bridge extending between the first end and the second end such that the first axis is substantially perpendicular to the second axis.

17 Claims, 4 Drawing Sheets

(56) References Cited

U.S. PATENT DOCUMENTS

| | | | |
|---|---|---|---|
| 8,637,165 B2 * | 1/2014 | Siahaan | H01R 13/03 |
| | | | 428/929 |
| 9,627,790 B2 * | 4/2017 | Anderson | H01R 13/115 |
| 10,056,707 B2 * | 8/2018 | Anderson | H01B 13/0026 |
| 2009/0246539 A1 | 10/2009 | Huck | |
| 2011/0151276 A1 | 6/2011 | Wiklund et al. | |
| 2018/0019529 A1 * | 1/2018 | Morimoto | H01R 43/20 |

FOREIGN PATENT DOCUMENTS

| | | | |
|---|---|---|---|
| CN | 102159741 A | 8/2011 | |
| CN | 202930252 U | 5/2013 | |
| CN | 204615008 U | 9/2015 | |
| CN | 105518942 A | 4/2016 | |
| CN | 107546520 A | 1/2018 | |
| EP | 3147180 A1 * | 3/2017 | ........... B62D 15/025 |
| KR | 20130103851 A | 9/2013 | |

\* cited by examiner

TERMINAL BLADE FOR HEADER ASSEMBLY

CROSS-REFERENCE TO RELATED APPLICATION

This application claims priority to U.S. Provisional Patent Application No. 62/835,313, filed on Apr. 17, 2019, the disclosure of which is incorporated by reference herein in its entirety.

BACKGROUND

Vehicle header assemblies include a housing and a terminal blade to electrically connect a control board to a steering system. A material of the terminal blade or a material of a coating for the terminal blade plays a role in securing the terminal blade to the housing. For example, certain coatings applied to the terminal blade may promote an undesirable adhesion with silicone applied to connect the housing and the terminal blade. This undesirable adhesion may result in poor sealing and leaks.

SUMMARY

According to one aspect of the disclosure, a terminal blade for a header assembly includes a first end defining a first axis and being partially coated with an anti-tarnish material and defining an adhesion region spaced from the anti-tarnish material coating. The terminal blade also includes a second end defining a second axis. The terminal blade further includes a bridge extending between the first end and the second end such that the first axis is substantially perpendicular to the second axis.

According to another aspect of the disclosure, a method of designing a terminal blade for a steering system is provided. The method includes determining a base metal material for the terminal blade. The method also includes determining an anti-tarnish material to be disposed on a portion of the base metal material based on a coefficient of friction of the anti-tarnish material. The method further includes determining a silicone material to be disposed on an adhesion region of the terminal blade based on adhesion with the anti-tarnish material.

According to another aspect of the disclosure, a header assembly for an electrical connection in a steering column includes a control board. The header assembly also includes a terminal blade housing defining a pair of apertures. The header assembly further includes a pair of terminal blades in contact with the control board to form an electrical connection. Each of the terminal blades includes a first end defining a first axis and being partially coated with an anti-tarnish material and defining an adhesion region spaced from the anti-tarnish material coating, the adhesion region coated with a silicone material. Each of the terminal blades also includes a second end defining a second axis. Each of the terminal blades further includes a bridge extending between the first end and the second end such that the first axis is substantially perpendicular to the second axis.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
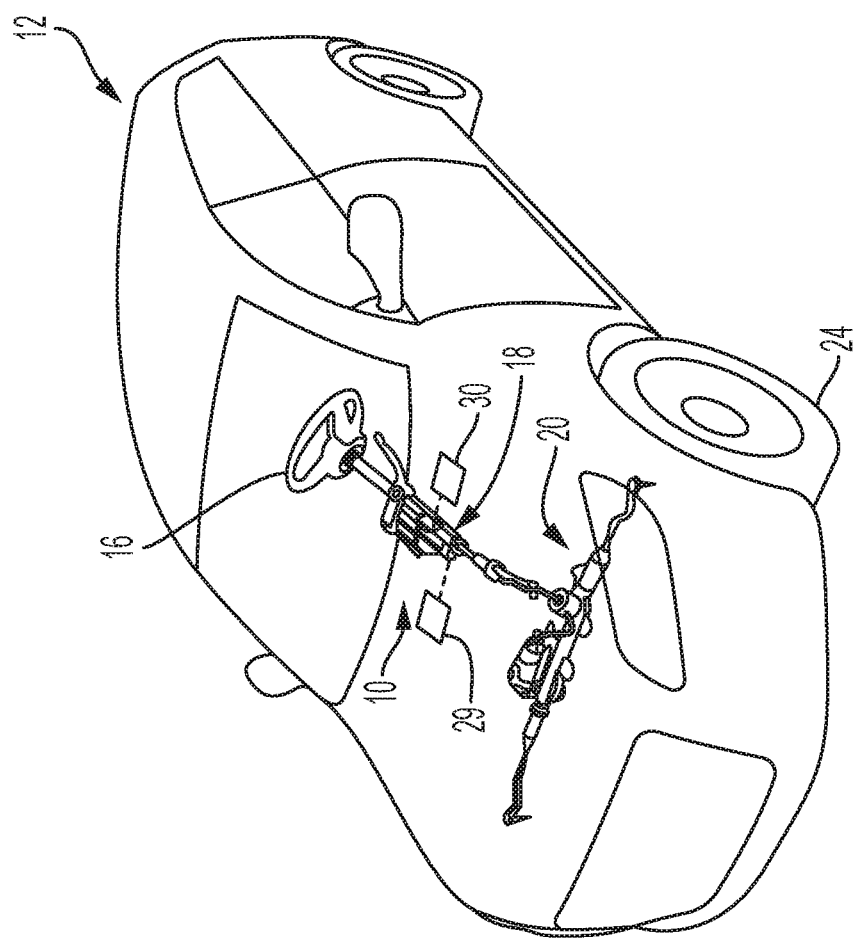
FIG. 1 is a perspective view of an example of a vehicle showing a portion of a steering system.

FIG. 1 illustrates an example of a steering assembly, referred to generally as a steering assembly 10 herein. The steering assembly 10 is shown disposed within a vehicle 12 in FIG. 1. The steering assembly 10 may assist in converting user inputs from a steering wheel 16 to direct movement of the vehicle 12. In this example, the vehicle 12 is a car, however, it is contemplated that the steering assembly 10 may be used to assist in steering other types of vehicles such as trucks, boats, aircraft, or other similar vehicles without departing from the scope of the present disclosure.

The steering assembly 10 may include the steering wheel 16 or other steering input device secured to an electric power steering assembly 18 for rotation. The electric power steering assembly 18 may be operatively connected to a rack and pinion assembly 20. The steering wheel 16, the electric power steering assembly 18, and the rack and pinion assembly 20 may be arranged with one another to direct movement of a front set of wheels 24 (only one wheel of the front set of wheels 24 is shown in FIG. 1) of the vehicle 12 based on a driver's input. For example, the rack and pinion assembly 20 may be operatively connected to each of the front set of wheels 24 via knuckles and tie rods to convey driver input from the steering wheel 16 for movement of each of the front set of wheels 24.

The steering assembly 10 may be in communication with a controller 29. The controller 29 may include programming to direct operation of components of the steering assembly 10 and/or to direct operation of other vehicle 12 components. The programming, for example, may output vehicle operation commands based on received signals and/or detected vehicle conditions.

Optionally, the steering assembly 10 may be in communication with a self-steering mechanism 30, such as an advanced driver assistance system or the like. The self-steering mechanism 30 may include programming to direct movement of the vehicle 12 without driver input to the steering wheel 16.

Figure 3:
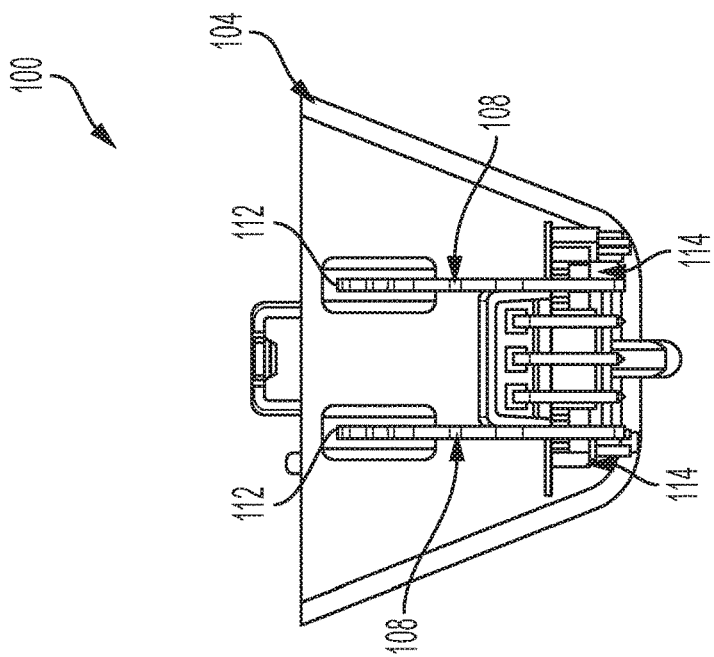
FIG. 3 is a top plan view of the portion of the header assembly of FIG. 2.
Figure 2:
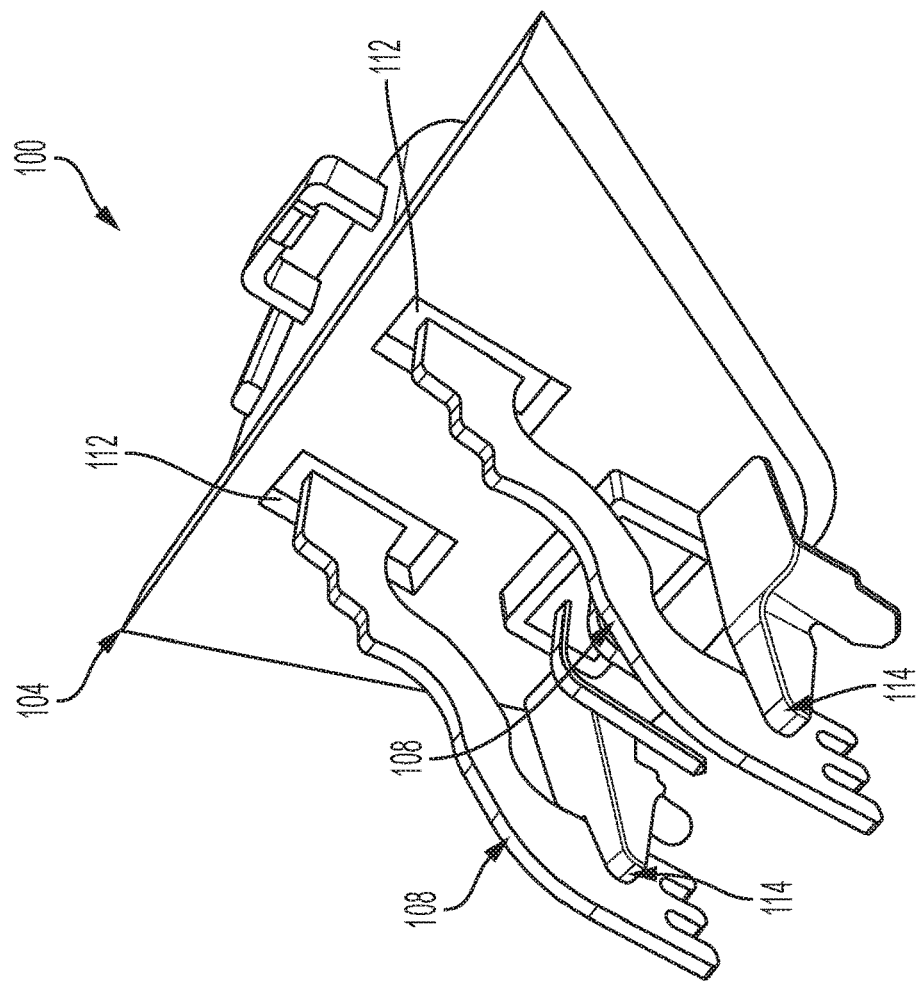
FIG. 2 is a perspective view of an example of a portion of a header assembly.

FIGS. 2 and 3 illustrate an example of a header assembly, referred to generally as a header assembly 100 herein. The header assembly 100 may be mounted and operatively connected to a portion of a steering system, such as the rack and pinion assembly 20 described in relation to FIG. 1. The header assembly 100 may include components to facilitate electrical communication between a control board and the portion of the steering system.

The header assembly 100 may include a housing 104 and a pair of terminal blades 108. The housing 104 may be structured to support a portion of each of the pair of terminal blades 108. For example, the housing 104 may define a pair of apertures 112 and a pair of support brackets 114. Each of the pair of apertures 112 may be sized to receive an end of a terminal blade as further described herein. Each of the pair of support brackets 114 may be sized to support a portion of a terminal blade.

Figure 4B:
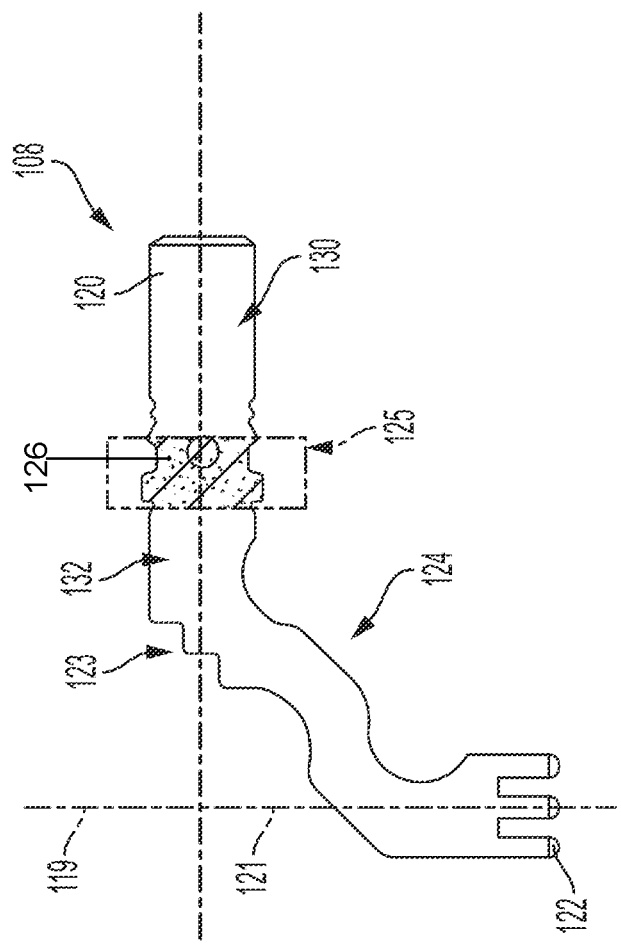
FIG. 4B is a plan view of the terminal blade of FIG. 4A.
Figure 4A:
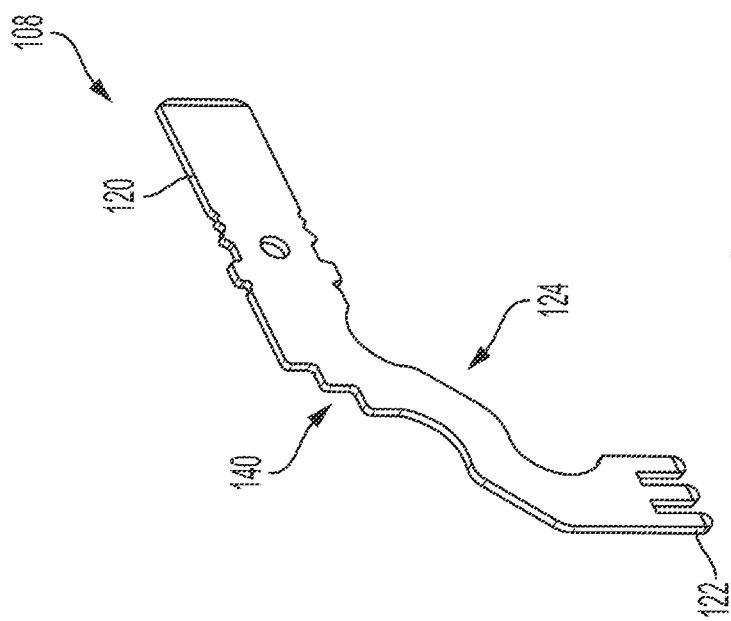
FIG. 4A is a perspective view of an example of a terminal blade for a header assembly.

FIGS. 4A and 4B illustrate further detail of one of the pair of terminal blades 108. FIG. 4A is a perspective view of one of the pair of terminal blades 108 and FIG. 4B is a top, plan view of one of the pair of terminal blades 108. Each of the pair of terminal blades 108 may include a first end 120, a second end 122, a step portion 123, and a bridge portion 124 extending between the first end 120 and the second end 122. The first end may define a first axis 119 and the second end may define a second axis 121. The first axis 119 and the second axis 121 may be oriented substantially perpendicular with one another.

A portion of each of the first ends 120 may be sized for extending into a housing of a header assembly. For example, a portion of each of the first ends 120 may be sized for extending into one of the pair of apertures 112 of the housing 104. Portions of each of the pair of terminal blades 108 may be coated with various materials for protection and to promote a robust connection between each of the pair of terminal blades 108 and the housing 104. An adhesion region 125 may be a region in which silicone 126 is applied to secure a respective terminal blade 108 to the housing 104 when the silicone hardens. This adhesion region 125 may be spaced from a seal region 130. The seal region 130 may be reflective of a portion of the terminal blade 108 that extends into the housing 104 and a portion of the terminal blade 108 for coating with an anti-tarnish material. The adhesion region 125 may be spaced from the seal region 130 to prevent or mitigate contact between the silicone and the anti-tarnish material.

Portions of each of the pair of terminal blades 108 may be coated with materials to assist in promoting adhesion between the first end 120 of a respective terminal blade 108, the housing 104, and silicone introduced to join the respective terminal blade 108 and the housing 104 to one another. Each of the pair of terminal blades may be of a copper material and coated with a material such as silver or tin. Anti-tarnish materials may also be applied to the terminal blades to protect the metal material. However, certain anti-tarnish materials have a coefficient of friction within a lower coefficient range that impedes adhesion with the silicone. In one example, Tarniban 51 may be an anti-tarnish material with a coefficient of friction within an acceptable range. A header assembly including this type of anti-tarnish material will likely have difficulty in securing the terminal blade to the housing. As such, adhesion between the components of the header assembly may be improved by selecting the materials that join with one another based on specific properties and/or selectively applying the coatings to the components.

With regard to a selection of the materials based on specific properties, three material selections are relevant as related to promoting a robust connection between each of the pair of terminal blades 108 and the housing 104. The three material selections relate to a type of metal of each of the pair of terminal blades, a type of anti-tarnish coating, and a type of silicone. Terminal blades are typically a copper component plated with another metal such as tin or silver. Portions of the tin or silver plating may be coated with an anti-tarnish material for protection. The type of this anti-tarnish material may present adhesion difficulties in securing the terminal blade 108 to the housing 104. For example, materials having a coefficient of friction within a low range are more likely to have failures when attempting to join with silicone materials. One example of the low range is a coefficient of friction value substantially equal to between 0.04 and 0.2.

With regard to selectively applying the coatings to the components, if a desired anti-tarnish material does not have an acceptable coefficient of friction, an adhesive region, such as the adhesion region 125, may be located such that the silicone applied to the adhesion region 125 does not or will have minimal contact with an anti-tarnish coating applied to the first end 120 of the terminal blade 108.

Figure 5:
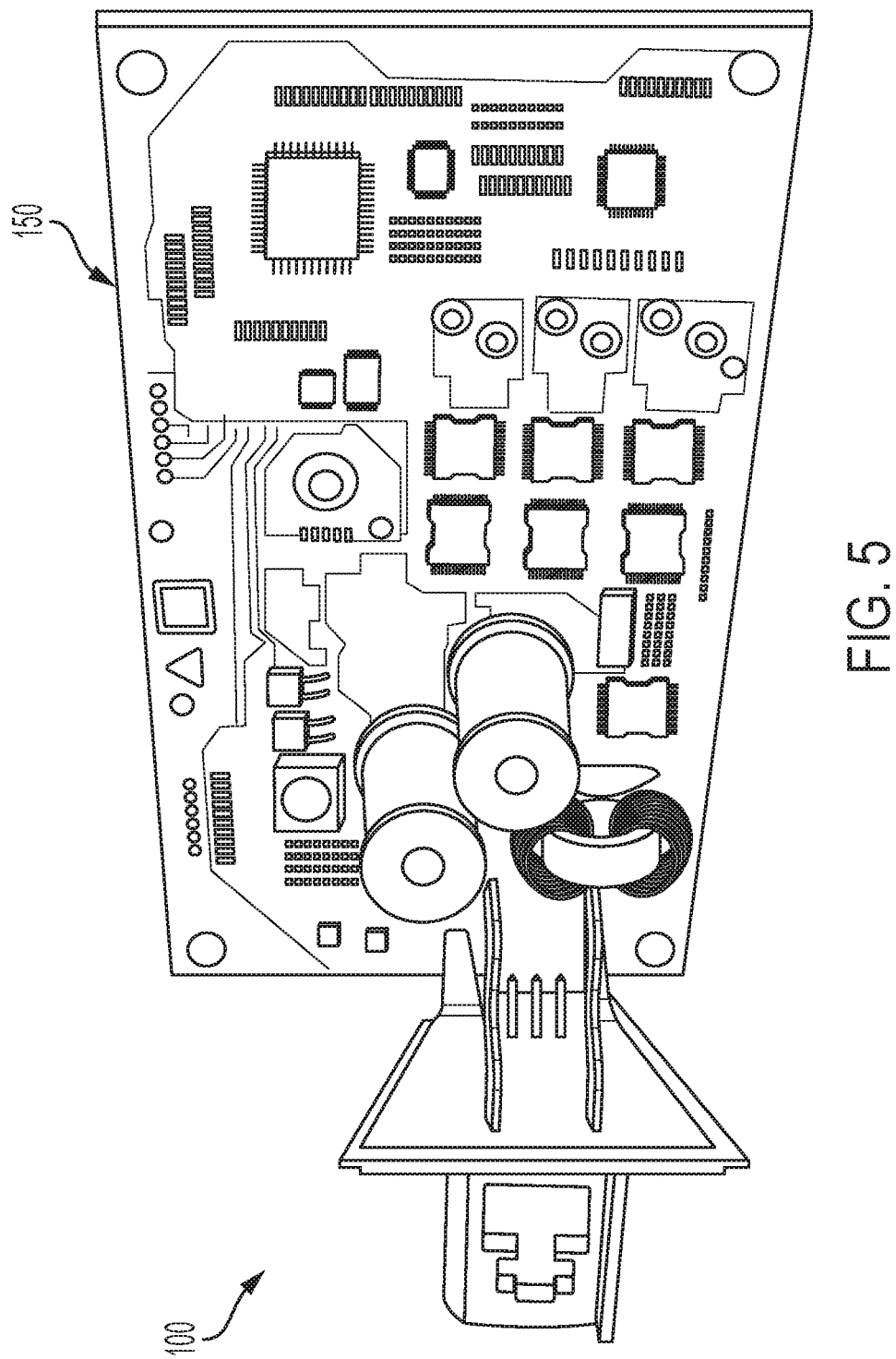
FIG. 5 is a perspective view illustrating an example of a header assembly secured to a controller board.

FIG. 5 illustrates an example of the header assembly 100 secured to a control board 150. The second ends 122 of each of the pair of terminal blades 108 may be prong shaped to facilitate and electrical connection with the control board 150. The header assembly 100 and the control board 150 may be located within a portion of a steering assembly, such as the rack and pinion assembly 20 as described in relation to FIG. 1.

While aspects of the invention have been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the disclosure. Additionally, while various embodiments of the invention have been described, it is to be understood that aspects of the invention may include only some of the described embodiments. Accordingly, the invention is not to be seen as limited by the foregoing description.

Having thus described the present disclosure, it is claimed:

1. A terminal blade for a header assembly comprising:
    a first end defining a first axis and being partially coated with an anti-tarnish material and defining an adhesion region spaced from the anti-tarnish material coating;
    a second end defining a second axis; and
    a bridge extending between the first end and the second end such that the first axis is substantially perpendicular to the second axis, wherein the adhesion region is spaced from the anti-tarnish material such that silicone applied to the adhesion region does not contact the anti-tarnish material.

2. The terminal blade of claim 1, wherein the anti-tarnish material is selected to include a coefficient of friction that promotes adhesion with silicone.

3. The terminal blade of claim 2, wherein the coefficient of friction of the anti-tarnish material is greater than 0.2.

4. The terminal blade of claim 1, wherein the terminal blade is formed of copper.

5. The terminal blade of claim 4, wherein the copper is plated with tin or silver.

6. The terminal blade of claim 1, wherein the terminal blade is disposed in a vehicle steering system.

7. A terminal blade for a header assembly comprising:
    a first end defining a first axis and being partially coated with an anti-tarnish material and defining an adhesion region spaced from the anti-tarnish material coating;
    a second end defining a second axis;
    a bridge extending between the first end and the second end such that the first axis is substantially perpendicular to the second axis; and
    silicone, wherein the first end is sized for insertion into a header aperture of a housing such that the silicone joins with the anti-tarnish material when the silicone hardens to secure the first end to the housing.

8. The terminal blade of claim 7, wherein the anti-tarnish material is selected to include a coefficient of friction that promotes adhesion with silicone.

9. The terminal blade of claim 7, wherein the terminal blade is formed of copper.

10. The terminal blade of claim 7, wherein the terminal blade is disposed in a vehicle steering system.

11. A header assembly for an electrical connection in a steering column comprising:
   a control board;
   a terminal blade housing defining a pair of apertures; and
   a pair of terminal blades in contact with the control board to form an electrical connection, wherein each of the pair of terminal blades comprises:
      a first end defining a first axis and being partially coated with an anti-tarnish material and defining an adhesion region spaced from the anti-tarnish material such that silicone applied to the adhesion region does not contact the anti-tarnish material, the adhesion region coated with a silicone material;
      a second end defining a second axis; and
      a bridge extending between the first end and the second end such that the first axis is substantially perpendicular to the second axis.

12. The header assembly of claim 11, wherein the anti-tarnish material is selected to include a coefficient of friction that promotes adhesion with the silicone material.

13. The header assembly of claim 12, wherein the coefficient of friction of the anti-tarnish material is greater than 0.2.

14. The header assembly of claim 11, further comprising silicone, wherein the first end is sized for insertion into a header aperture of a housing such that the silicone joins with the anti-tarnish material when the silicone hardens to secure the first end to the housing.

15. The header assembly of claim 11, wherein the terminal blade is formed of copper.

16. The header assembly of claim 15, wherein the copper is plated with tin or silver.

17. The header assembly of claim 11, wherein the steering column is equipped with an advanced driver assistance steering system.

* * * * *